United States Patent [19]

Andrieux et al.

[11] Patent Number: 5,680,906
[45] Date of Patent: Oct. 28, 1997

[54] METHOD FOR REAL TIME LOCATION OF DEEP BOREHOLES WHILE DRILLING

[75] Inventors: Patrick Andrieux, Pierrefonds; Richard G. McCreary, Pointe-Claire, both of Canada

[73] Assignee: Noranda, Inc., Toronto, Canada

[21] Appl. No.: 684,730

[22] Filed: Jul. 22, 1996

Related U.S. Application Data

[63] Continuation of Ser. No. 355,182, Dec. 8, 1994, abandoned.

[51] Int. Cl.⁶ ............................................. E21B 47/09
[52] U.S. Cl. .......................... 175/45; 181/106; 367/33
[58] Field of Search ...................... 175/45, 40; 181/106, 181/102; 367/33

[56] References Cited

U.S. PATENT DOCUMENTS

| | | | |
|---|---|---|---|
| Re. 33,751 | 11/1991 | Geczy et al. | 175/61 |
| 3,993,974 | 11/1976 | Silverman | 181/102 X |
| 4,003,017 | 1/1977 | Bailey | 175/45 X |
| 4,144,949 | 3/1979 | Silverman | 181/106 |
| 4,189,704 | 2/1980 | Martin et al. | 367/60 |
| 4,252,209 | 2/1981 | Silverman | 175/45 X |
| 4,363,112 | 12/1982 | Widrow | 367/30 |
| 4,460,059 | 7/1984 | Katz | 181/102 |
| 4,562,558 | 12/1985 | Ostrander | 367/68 |
| 4,594,691 | 6/1986 | Kimball et al. | 367/32 |
| 4,653,593 | 3/1987 | Lindberg | 173/1 |
| 4,894,809 | 1/1990 | Moeckel | 367/57 |
| 5,018,112 | 5/1991 | Pinkerton et al. | 367/72 |
| 5,031,158 | 7/1991 | Chamuel | 367/118 |
| 5,109,947 | 5/1992 | Rector, III | 181/106 |
| 5,220,963 | 6/1993 | Patton | 175/24 |
| 5,230,386 | 7/1993 | Wu et al. | 175/45 |
| 5,230,387 | 7/1993 | Waters et al. | 175/45 |
| 5,242,025 | 9/1993 | Neill et al. | 175/26 |
| 5,269,383 | 12/1993 | Forrest | 175/45 |
| 5,305,285 | 4/1994 | Naville et al. | 367/49 |
| 5,414,674 | 5/1995 | Lichman | 367/49 |

FOREIGN PATENT DOCUMENTS

| | | |
|---|---|---|
| 2002468 | 5/1990 | Canada . |
| 1274817 | 10/1990 | Canada . |
| 2035299 | 10/1991 | Canada . |
| 2024061 | 2/1992 | Canada . |
| 2060449 | 8/1992 | Canada . |

*Primary Examiner*—Hoang C. Dang
*Attorney, Agent, or Firm*—Fitzpatrick, Cella, Harper & Scinto

[57] ABSTRACT

The present invention is concerned with a system for the real time location of deep boreholes while drilling. The system includes a plurality of sensors sensitive to seismic vibrations disposed in an area where a borehole is to be drilled, the sensors being adapted to selectively pick up the vibrations emitted by the drilling bit as it progresses through the rock. The data picked up by the sensors is then processed and the results are displayed in real time, thus allowing the operator to know precisely the location of the drill bit as the hole is being drilled.

14 Claims, 4 Drawing Sheets

METHOD FOR REAL TIME LOCATION OF DEEP BOREHOLES WHILE DRILLING

This application is a continuation of application Ser. No. 08/355,182 filed Dec. 8, 1994, now abandoned.

FIELD OF INVENTION

The present invention is concerned with a method for the localization of deep boreholes in real time by using a plurality of seismic sensors that selectively pick up vibrations originating from the drilling bit as it progresses through the rock.

BACKGROUND OF THE INVENTION

In the mining industry, it is well known that drilling blastholes outside their planned locations causes damage to walls and/or abutments which can, in turn, cause ground instability and ore dilution. These consequences are very costly to a mining company, in terms of both safety and production costs. Enormous amounts of energy can be stored in a single blasthole. For example, a 4.5 inch diameter blasthole, loaded with a 100 ft high AnFO (Ammonium Nitrate Fuel Oil) explosive column has an energy as high as about 1GJ. Deviating blastholes can easily damage the following mine structures:

1. pillars, thus affecting global stope stability
2. backfill, thus causing dilution and/or stability problems; and
3. footwall/hanging wall/abutments/crown areas, thus causing instability and dilution.

Any waste material accidentally blasted has to be mucked, hauled, crushed, hoisted to the surface and treated at nominal cost to finally end up on the tailing pond, thus also contributing to the environmental problems linked to these waste retention areas. Inaccurate drilling is highly undesirable, since it affects overall blasting efficiency, causes damage, reduces stability, safety and mill grades, and leads to increased mining costs and decreases business competitiveness.

Drilling accuracy is therefore a critical issue. Typically, a blasting design comprises the layout of the drilling, i.e., the 3-D location of each hole, as well as the layout of the blasting itself, i.e., explosive types, sequencing, timing, decking, etc. Although drilling technology has significantly improved over the past decades, the drilling accuracy remains a serious problem. Several reasons can explain such inaccuracy. For example, it is common that drill operators are paid significant bonuses on a footage basis. Accordingly, they often "push" the drills at maximum torque, causing holes to deviate from their initial trajectories. Also, to save time, operators may neglect the upmost important aspect of the drill and boom setups before drilling. Furthermore, certain structural geology features, such as bedding, joints, foliation, faults or dykes, can push drilling bits out of trajectory if the angle of incidence is too shallow. Finally, as often seen on the field, operators try to drill holes excessively deep with regards to the diameter of the bit and rods, which will also cause deviation.

Excessive hole deviation is thus a serious problem with important adverse technical and economical consequences. Not being able to systematically drill the holes as planned renders the contemplated optimization substantially useless. An analogy would be a firearm with state of the art ammunition but deprived of any aiming device.

Many attempts have been made to, short of being able to drill the holes precisely, at least measure where they end up being. Several instruments claiming to meet this goal have been commercialized without achieving their objective because of problems related to highly magnetic grounds for compass-based instruments, drifting problems for gyroscope-based devices, fragility and rigidity problems, etc. Further, these are "after-the-fact" tools which require significant manpower. For example, two or more operators will take an entire eight hours shift to survey just a few holes.

Although some systems are successfully used in the oil industry to survey well locations and steer drilling bits, those remain unadapted to mining needs, mainly because they have high acquisition and operating costs, and they are large, cumbersome, fragile, difficult to operate and complex to interpret. U.S. Pat. No. 5,220,963, U.S. Pat. No. 5,269,383, U.S. Pat. No. Re 33,751, U.S. Pat. No. 5,230,386, U.S. Pat. No. 5,230,387, U.S. Pat. No. 4,653,593 are all oil-industry related and rely on strata-recognition or active instrumentation such as location transmitters, or sensors measuring inclination, magnetic field, deviation from a pre-set direction, etc., mounted directly in or behind the drilling bit and, thus, located at the bottom of the hole, at the end of the drill rod string. These instruments transmit the results of their readings, or measurements to the surface, where they are processed and analyzed. Tests done in the past in a mining production environment with underground long-hole production drilling machines with such in-hole instrumentation have not been successful, mainly because of system breakdown, the very high impacts and large vibrations encountered in the vicinity of production percussion drill bits having always rapidly either damaged or destroyed such instrumentation.

It would therefore be highly desirable to develop a method for drilling holes which allows the operator to determine the drill bit location as he drills, i.e., in real time. If the borehole starts to deviate, the operator would then be in a position to either restart the hole, or, eventually, to correct its path, thus resulting in optimized drilling. Furthermore, this process would not be "after-the-fact", as are some instruments currently used to survey the location of boreholes after they are drilled. These systems are not always very accurate, consume significant time and manpower and allow for no corrective action, other that bringing the drilling rig back to an area to redrill the most badly deviated boreholes.

SUMMARY OF THE INVENTION

According to the present invention, there is now provided a system for the real time location of deep boreholes while drilling, the method comprising disposing a plurality of sensors sensitive to seismic vibrations around an area where a borehole is to be drilled, the sensors being adapted to selectively pick up the vibrations emitted by the drilling bit as it progresses through the rock. The data picked up by the sensors is then processed and the results are displayed in real time, thus allowing the operator to know exactly the location of the drill bit.

In a preferred embodiment of the invention, another sensor sensitive to vibrations is mounted on or adjacent the drill mast, away from the drill bit to obtain the zero reference time at which vibrations are emitted into the rock.

The sensors may be accelerometers, geophones, hydrophones, or combinations thereof, which are commonly used in mine-wide microseismic surveillance.

The method for the real time location of deep boreholes, which comprises the use of a system described above, is also part of the present invention.

IN THE DRAWINGS

DETAILED DESCRIPTION OF THE INVENTION

The system of the present invention relies on seismic source location technology, where arrays of seismic sensors such as sensitive accelerometers, geophones or hydrophones, selectively pick up the vibrations emitted by the drilling bit as it drills through the rock, and where its precise location is mathematically triangulated based on seismic wave travel times from the source to the various sensors. Therefore, a computer program has been developed to process the data from the seismic sensors.

The vibration signals from a percussion drilling bit consists in a series of distinct pulses which must he mathematically handled to produce useful information. For this purpose, a stacking algorithm is used to boost signal-to-noise ratio and to make the time at which the signal arrives easier to locate.

A major problem encountered during the development of the system of the present invention is the poor quality of the signal recorded on the drill mast. This signal is needed to give the "zero reference time" at which vibrations are emitted from the bit. This problem was rectified by using a sophisticated bandpass filter. This digital filter is of the more stable FIR (Finite Impulse Response) type with a Hanning type window, which is characterized by a response delay independent of the frequency, with a bandpass frequency of 3–4 kHz. Another problem was that originally, each seismic sensor was controlled by its own independent computer, fitted with its own acquisition system. With such system, it has been found that a very slight desynchronization between the independent clocks was sufficient to seriously impair the stacking process, the latter being highly sensitive to this parameter. To overcome this problem, all the computers have been synchronized on one clock. It should however be noted that independent clocks may still be used as long as they are perfectly synchronized.

The system may also work without a sensor on the drill mast. The reference signal is then chosen from one of the signals coming from the seismic sensors disposed around the area drilled. The preferred signal will be the one with the lowest background noise, and the subsequent calculations will be based on this signal. The sensor on the drill mast is generally needed where there is a lot of background noise caused, for example, by another hole being drilled nearby.

Field trials

Figure 1:
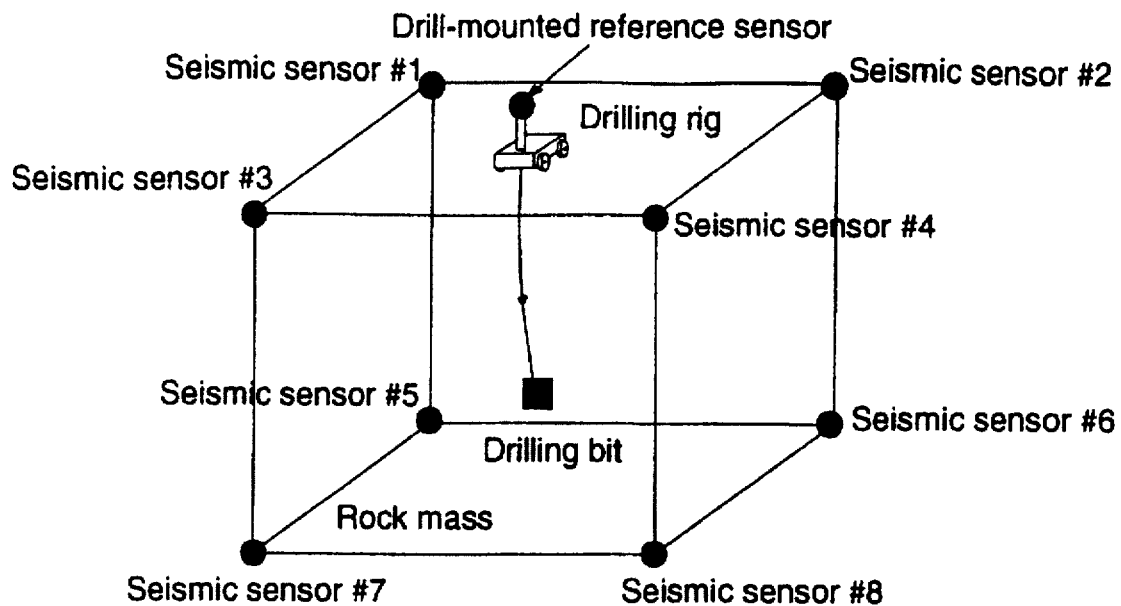
FIG. 1 illustrates seismic recording sensors surrounding a test area where a hole is to be drilled.

Referring to the drawings, field trials consisted in recording the seismic vibrations emitted by a percussion drilling bit as it impacts the rock, with eight accelerometers surrounding the test area and grouted to the rock mass as illustrated in FIG. 1. Four accelerometers are located on the upper drilling level, and four others are located on the lower drilling level. A ninth accelerometer, installed on the drill mast, is used to obtain the zero reference time at which vibrations are emitted into the rock. Vibrations were recorded for 45 seconds every 12 feet along the length of five breakthrough holes, generating a total of over 40 measurements. Only breakthrough holes were monitored since the conventional surveying of their toe locations was used to assess the accuracy of the new technique. After final analysis of the information recorded, it was found that the processed data yielded locations within 5 feet of the actual hole locations.

The flow of seismic data between the sensors and the acquisition and processing boards can be supported either by wires, using twisted pairs, or by radio waves, using any conventional leaky feeder technology-based mine-wide communication system. However, wireless communication techniques such as distributed antennas or VLF (Very Low Frequency) systems may also be used.

The real time system for the location of deep boreholes according to the present invention has significant advantages over the system currently available:

a) It does not rely on any external device such as a transmitter, mounted inside or close behind the drill bit. In the past, it has been shown that the longevity of such transmitter is extremely limited, varying from a few cycles to a few shifts. Furthermore, the high vibration levels and repeated high g-impacts encountered close to a drill bit affect sophisticated monitoring equipment. Accordingly, in the present invention, the drilling bit only acts as a seismic source, without any modification made to it. Replacement operations of the bit are therefore greatly simplified;

b) Precise coordinates and trajectories for each drilled hole can be extracted without supplemental work from the drill operator, since the data is automatically recorded, collected and downloaded on computer by a surveyor. The work load of the drill operator is therefore not increased; and c) Being able to locate the holes in real time may allow to steer the drilling bit in the future. Steering control over the bit would allow the correction of deviation as it happens, rather than merely observing it and having to restart excessively deviated holes.

Software

The software developed for the purposes of the present invention comprises two main applications: a stacking application and a window application, which are both in the same program.

Figure 2:
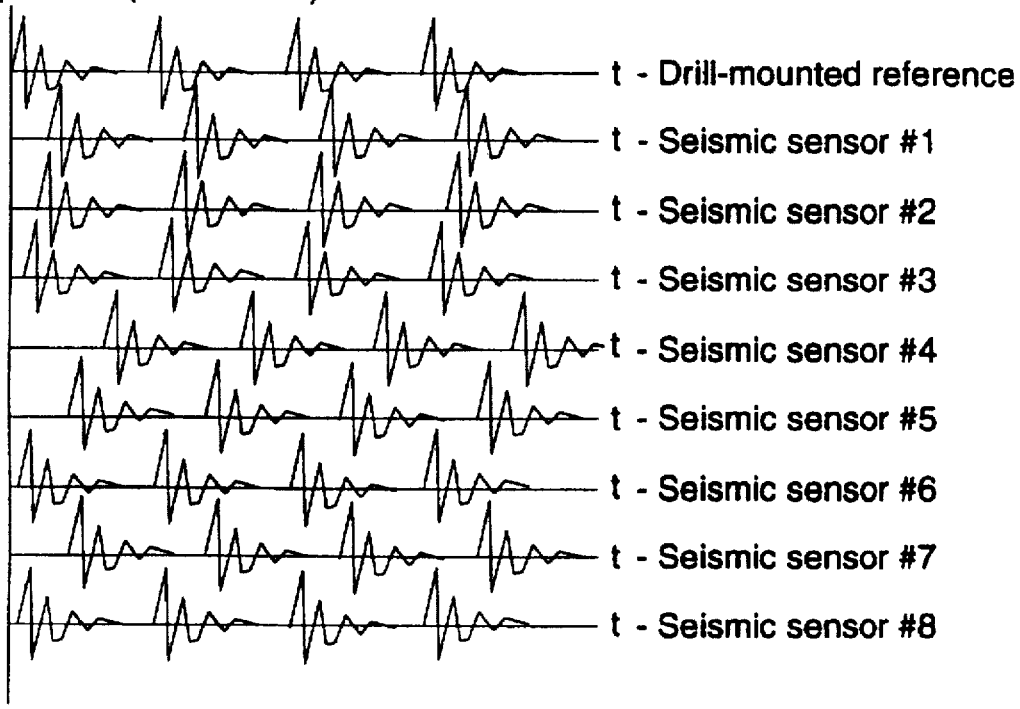
FIG. 2 illustrates a scheme of the wave forms as picked up by each sensor.

FIG. 2 illustrates a scheme of the wave forms as picked up by each sensor. Since the distance from the drill bit varies from one sensor to the other, the time for a wave to reach each sensor is different.

Figure 3A:
FIG. 3A–3D illustrate the effects of the window function and the stacking system.
Figure 3B:
Figure 3C:
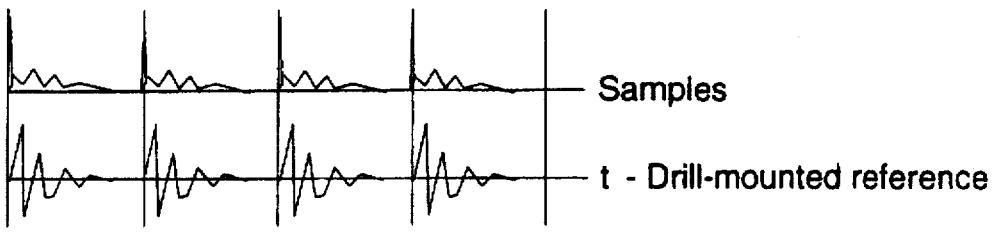
Figure 3D:
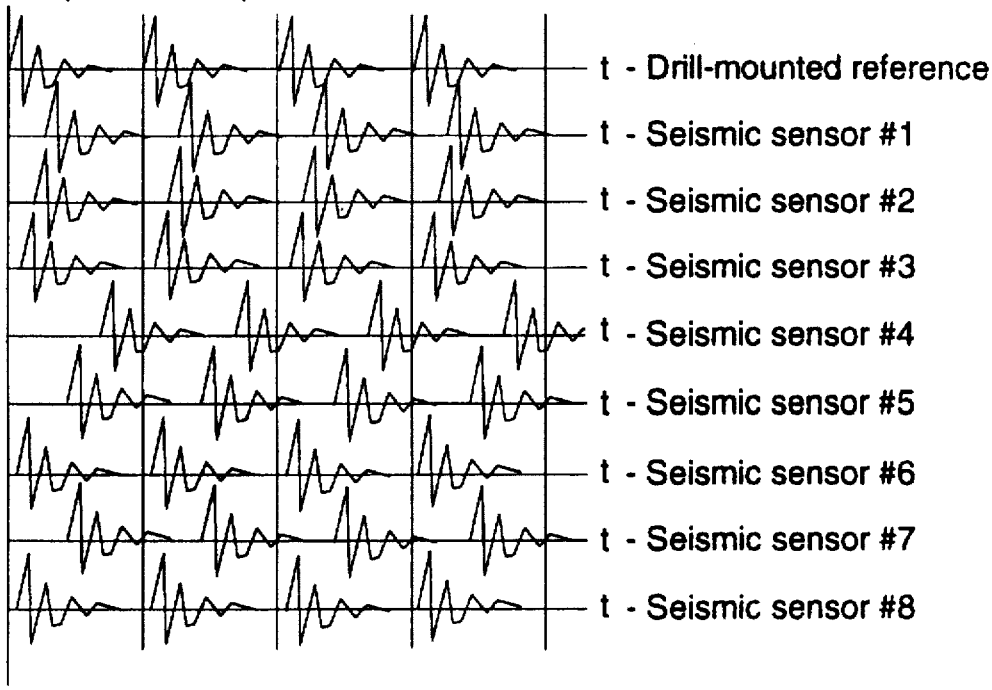

In the window application, the window function is applied to the reference wave form to obtain the length of one reference cycle (FIG. 3A). The window is moved throughout the reference signal at each data point and returns the ratio of integral of right side over integral of left side. The maximum value corresponds to the beginning of one cycle (FIG. 3B). The beginning of each cycle of the reference signal will give the length of the signal that will be processed by the stacking algorithm (FIG. 3C). The processing length will be the same for all the signals to insure proper synchronization (FIG. 3D).

Figure 4:
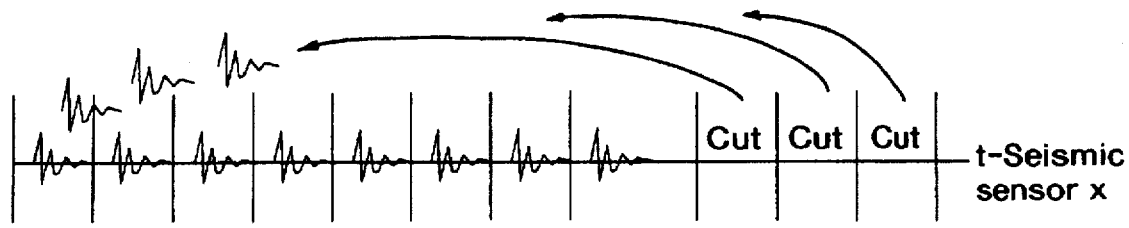
FIG. 4 illustrates the stacking of all the cycles for one sensor.
Figure 5:
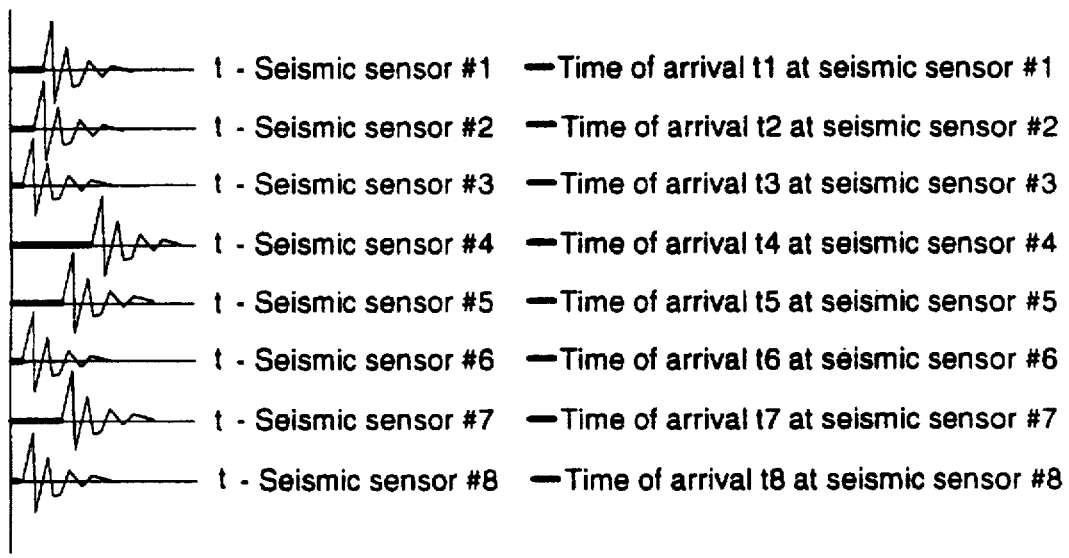
FIG. 5 illustrates the time of arrival of the wave for each sensor, as a result of the processing according to the window function and the stacking system.
Figure 6:
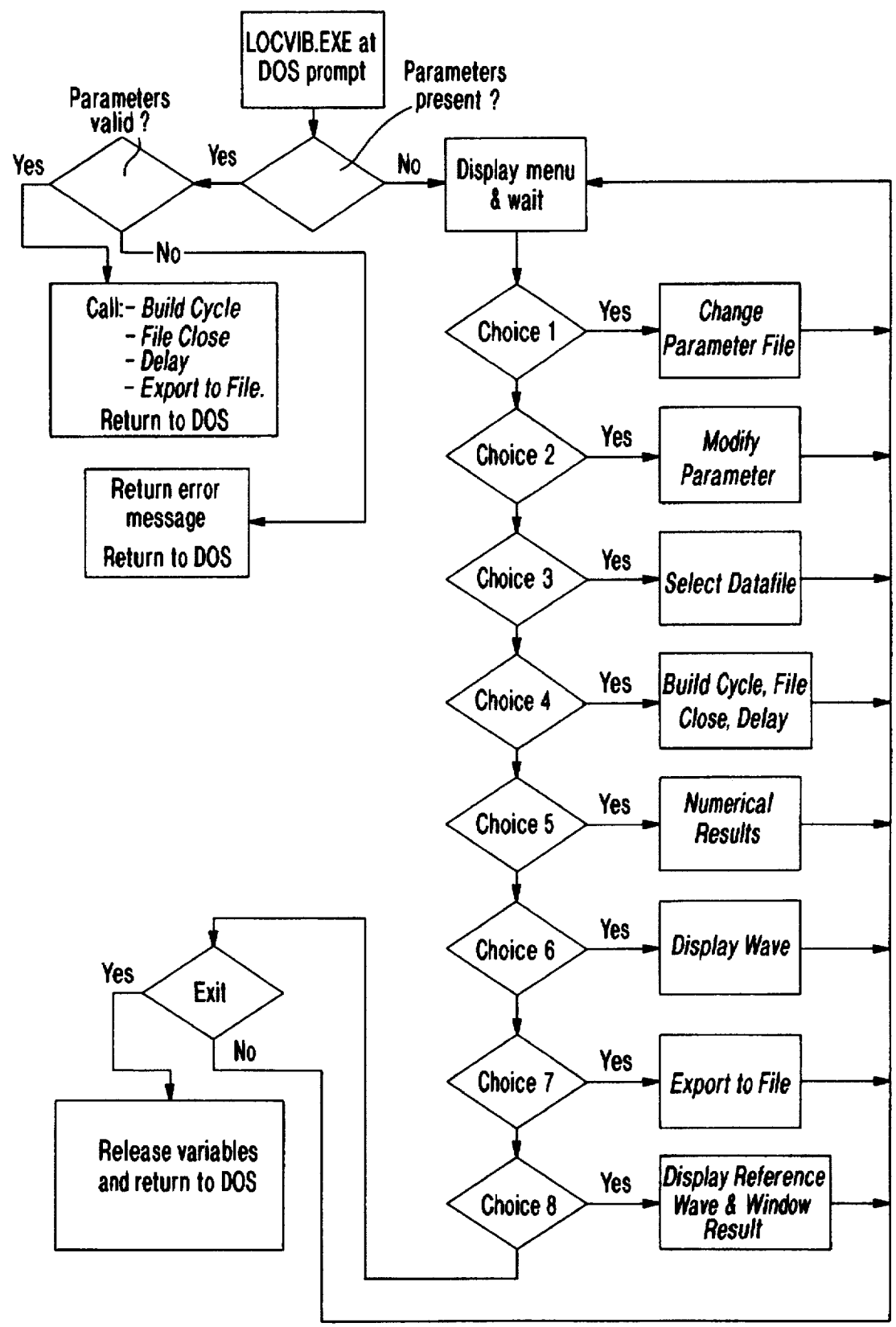
FIG. 6 illustrates the algorithm used for the stacking of the cycles.

In the stacking application, the program stacks a recorded wave form, typically one produced by one of the accelerometers located in the rock and surrounding the stope, with respect to a reference signal, normally that produced by the accelerometer mounted on the drill mast. The program first processes the reference signal to precisely locate the instant at which each of its successive cycles starts (FIGS. 3A–C). These time periods are then used to extract the signal cycles from the sensors of interest which are then added, as shown in FIGS. 3D and 4. The resulting wave, or "stacked wave," has only one cycle which is highly representative of the numerous cycles in the original signal, with the background noise significantly reduced. The time of arrival of the wave at each sensor may then be easily obtained with the window function since the rise time is sharp and the noise low as a result of the stacking process (FIG. 5).

The purpose of the stacking algorithm is to provide a way to reliably pick arrival time of the vibration waves emitted by the drilling bit at all the sensors surrounding the drilled stope, for source location purposes. The window program is used first on the reference signal to obtain the length of signal on which the subsequent stacking process will be applied. This length of signal extends from the very beginning of the pulse on one cycle to the very beginning of the pulse on the next cycle (FIGS. 3A–D). Once this window is established, the stacking process is applied. This process consists of cutting the seismic records from all the surrounding seismic sensors by the length determined by the window process and to add each of these partial records on top of the first one (FIG. 4). This produces, for each seismic record, a single cycle highly representative of all the cycles which made the original seismic record, with a very high amplitude and a strongly boosted signal-to-noise ratio. Once the stacking operation is completed, the window function is used again on each stacked seismic record to locate the beginning of the stacked cycle relatively to the reference signal, which has to be corrected to account for the travelling time of the impact waves through the train of steel rods. The window algorithm locates the beginning of any distinct waveform by moving a window, centered at each successive data point, and by dividing the integral of the right half of the window by the integral of the left half. The peak of this function gives the time at which the signal begins. For a stacked signal, this time is given with respect to the reference signal (FIG. 5).

The program can be modified to get the data either directly from the seismic sensors or from input files. Although the synchronizing system signal recorded on the drill mast is clean enough for conventional purposes, modifications can be made to the system. For example, the drill-mounted accelerometer can be fitted with variable gain capability and with bandpass filtering capabilities for removing low frequency mechanically-induced oscillations and noises, as well as high frequency resonance occurrences. While the invention has been described in connection with specific embodiments thereof, it will be understood that it is capable of further modifications and this application is intended to cover any variations, uses or adaptations of the invention following, in general, the principles of the invention and including such departures from the present disclosure as come within known or customary practice within the art to which the invention pertains, and as may be applied to the essential features herein before set forth, and as follows in the scope of the appended claims.

What is claimed is:

1. A system for the real time location of deep boreholes while drilling, comprising:

a plurality of seismic sensors disposed in an area where the borehole is drilled, the sensors being adapted to selectively pick up a series of distinct cyclic pulses emitted from a percussion drilling bit; and a computer to process the data obtained from the sensors and to display in real time the location of the bit in the rock mass, whereby an operator can see the location of the bottom of the borehole being drilled in real time and modify the path of the percussion drilling bit, said computer applying a window function to a reference signal from a reference sensor to obtain the length of one reference cycle, said computer thereafter applying a stacking application to the signal from each of the other sensors over the reference cycle to produce, for each sensor, a stacked wave having one cycle, said computer thereafter applying a window function to each stacked wave from the other sensors to determine the beginning of each stacked wave relative to the reference cycle, the beginnings of the stacked waves for said other sensors being measured with respect to the beginning of the reference cycle to determine the location of the bit.

2. A system according to claim 1 wherein the seismic sensor means are a plurality of seismic sensors.

3. A system according to claim 2 wherein the seismic sensor is selected from the group consisting of an accelerometer, a geophone, a hydrophone, and combinations thereof.

4. A system according to claim 1 wherein seismic data is pick up in a synchronized manner through a clock located on a single A/D (analog to digital) conversion card located in one central computer, or through independent clocks located on independent A/D (analog to digital) conversion cards located close to the seismic sensors and synchronized together by a synchronizing pulse.

5. A system according to claim 3 comprising eight accelerometers.

6. A system according to claim 1, wherein said seismic sensor means comprise at least one sensor disposed on the surface of the ground be drilled, and at least one sensor disposed beneath the surface.

7. A system according to claim 6, wherein said seismic sensor means include at least one sensor disposed below the surface and below the percussion drilling bit.

8. A method for the real time location of deep borehole, comprising the steps of:

disposing a plurality of seismic sensors adapted to selectively pick up distinct, cyclic vibrations emitted from a percussion drilling bit in an area where the borehole is to be drilled;

drilling the borehole;

while drilling the borehole, collecting and stacking data obtained from the sensor means with the help of a computer, the computer displaying in real time the location of the bit, whereby an operator can see the path of the borehole and modify its path by steering the bit, said computer applying a window function to a reference signal from a reference sensor to obtain the length of one reference cycle, said computer thereafter applying a stacking application to the signal from each of the other sensors over the reference cycle to produce, for each sensor, a stacked wave having one cycle, said computer thereafter applying a window function to each stacked wave from the other sensors to determine the beginning of each stacked wave relative to the reference cycle, the beginnings of the stacked waves for said other sensors being measured with respect to the beginning of the reference cycle to determine the location of the bit.

9. A method according to claim 8 wherein the seismic sensor means are a plurality of seismic sensors.

10. A method according to claim 9 wherein the seismic sensor is selected from the group consisting of an accelerometer, a geophone, a hydrophone, and combinations thereof.

11. A method according to claim 8 wherein seismic data is picked up in a synchronized manner through a clock located on a single A/D (analog to digital) conversion card located in one central computer, or through independent clocks located on independent A/D (analog to digital) conversion cards located close to the seismic sensors and synchronized together by a synchronizing pulse.

12. A system according to claim 10 comprising eight accelerometers.

13. A method according to claim 8, wherein the step of disposing seismic sensor means includes the step of disposing at least one sensor on the surface of the ground to be drilled, and at least one sensor below the surface of the ground.

14. A method according to claim 13, wherein the step of disposing seismic sensor means includes the step of disposing one sensor below the surface of the ground and below the percussion drilling bit.

* * * * *